UNITED STATES PATENT OFFICE.

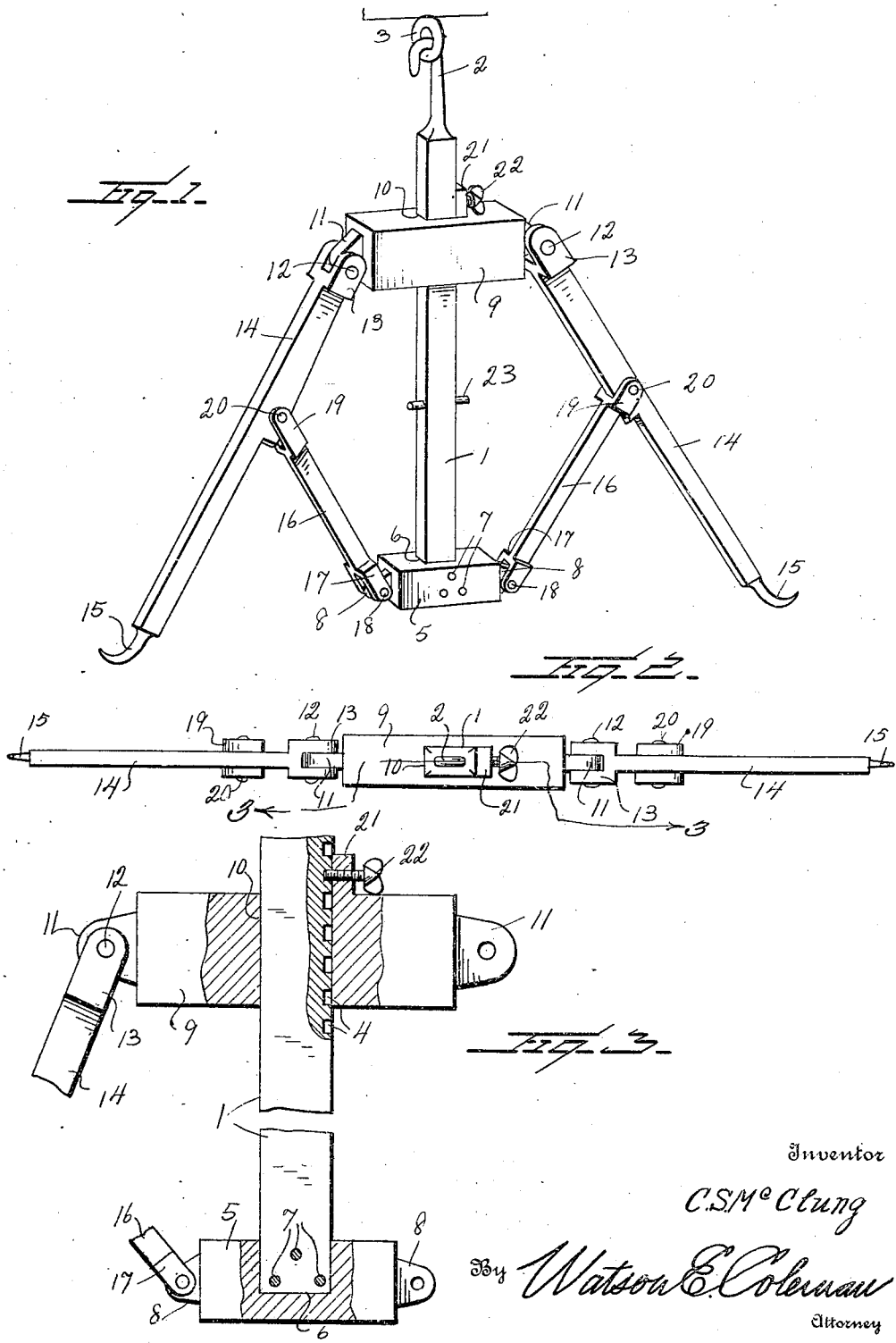

CHARLIE SPURGEON McCLUNG, OF LONGACRE, WEST VIRGINIA.

GAMBREL.

1,373,823.  Specification of Letters Patent.  Patented Apr. 5, 1921.

Application filed July 19, 1919. Serial No. 311,965.

*To all whom it may concern:*

Be it known that I, CHARLIE SPURGEON McCLUNG, a citizen of the United States, residing at Longacre, in the county of Fayette and State of West Virginia, have invented certain new and useful Improvements in Gambrels, of which the following is a specification, reference being had to the accompanying drawings.

This invention relates to an improved gambrel for suspending carcasses when cleaning the same, and the invention aims to provide a very simple, efficient and practical device of this kind, which may be manufactured for a small cost and sold at a reasonable profit.

A further object of the invention is the provision of an improved gambrel, the carcass supporting arms of which being adjustable, whereby carcasses of different sizes may be easily suspended in position.

The invention further aims to provide an adjustable head mounted upon a suspending member and carrying the carcass supporting arms, and means carried by the head and engaging said suspending member to hold the head in different adjusted positions, whereby the carcass supporting arms may be disposed to hold carcasses of different proportions.

The invention further aims to provide a base member at the lower end of the suspending member and provided with link connections with said arms, to spread the arms when the head is adjusted, in order to accommodate carcasses which vary in dimensions transversely.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in perspective of the improved gambrel, constructed in accordance with the invention.

Fig. 2 is a plan view.

Fig. 3 is a sectional view on line 3—3 of Fig. 2.

Referring more especially to the drawings, 1 designates a suspending member, which is provided with a hook 2 at its upper end, which may be connected to any suitable eye, such as shown at 3, which is carried by a lateral projecting beam, whereby the gambrel may be suspended in position, to hold the carcass. The suspending member or rod 1 is preferably rectangular in cross-section as shown, though not necessarily, and one of its faces near its upper portion is provided with a plurality of depressions 4. A base member 5, which is provided with a rectangular depression 6, is secured to the lower end of the suspending member 1. Suitable rivets or other fastening means 7 pass through the base member, and through the lower end of the suspending member 1, as shown, to hold the lower end of the member or rod 1 in said depression. The base member 5 is provided with lateral ears 8.

A gambrel head 9 is provided and is slidably mounted upon the suspending member or rod 1. This head 9 has an opening 10 corresponding to and receiving the suspending member or rod 1. This opening is of a size in cross-section to neatly fit the suspending member or rod 1, the fit being sufficient to permit the head to move freely on the rod or member 1. The head 9 has laterally projecting ears 11, to which by means of pivot pins or rivets 12, the forked ends 13 of the carcass supporting arms 14 are pivotally connected. The forks 13 of the arms 14 straddle the ears, so as to reinforce the connecting parts. While the lower parts of the arms 14 are shown as reduced, it is obvious that they may be the same thickness throughout their entire length. The lower ends of the carcass supporting arms terminate in hooks 15 to be engaged by the leaders of the hind legs of the carcass, so as to suspend the carcass with the legs spread apart. Links 16 are provided, and their forks 17 at their lower ends straddle the ears 8 of the base member 5, there being pivot or rivet pins 18 passing through the forks and the ears 8, to pivotally mount the links. The upper ends of the links have forks 19, which straddle the carcass supporting arms 14, and are pivotally connected thereto by the pivot pins or rivets 20. A projection or lug 21 is carried by the head 9, and engaging said lug or projection is a set screw 22.

When suspending a carcass for cleaning, the set screw 22 is loosened, and the lower ends of the arms 14 are moved or swung toward the base plate. The hind legs of the carcass are then connected to the hooks 15, and by pulling downwardly upon the head 9, the arms 14 are caused to spread, thereby stretching or spreading the hind legs of the carcass apart, thereby permitting the butcher to easily have access to the entrails and the like of the carcass, for the purpose of cleaning. When the legs of the carcass have been stretched sufficiently, the set screw 22 may be tightened so that its end may engage any one of the depressions 4 in one of the sides of the suspending member or rod 1, thereby holding the carcass supporting arms firmly in the desired position, to accommodate the carcass. A pin 23 is positioned transversely of the suspending member or rod 1, and is adapted to contact with the under face of the head 9, when the head is moved downwardly, thereby limiting the carcass supporting arms during their spreading actions.

The invention having been set forth, what is claimed as new and useful is:

In a gambrel, the combination with a suspending member rectangular in cross-section and provided on one of its edges with a series of spaced sockets, of a base having a depression rectangular in shape, in which the lower end of the member is fixedly but detachably secured, a head having a vertical opening through which the member passes, whereby the head may be adjusted vertically, said head having an outwardly projecting lug adjacent one edge of the member, a set screw threaded in the lug and adapted to slidably engage said sockets, to hold the head in different positions on the member against movement in either direction, a pair of arms having hooks pivotally mounted upon the laterally extending ends of the head, whereby the legs of a carcass may engage the hooks for suspending the carcass, a pair of links pivotally connected to the base and extending upwardly and laterally in opposite directions and having their upper lateral ends pivotally connected to the arms substantially midway their ends, and a pin extending transversely of the member, to limit the head in its movement downwardly.

In testimony whereof I hereunto affix my signature in the presence of two witnesses.

CHARLIE SPURGEON McCLUNG.

Witnesses:
N. E. WITHROW,
ERNESTINE FLETCHER.